United States Patent
Goto et al.

Patent Number: 5,567,217
Date of Patent: Oct. 22, 1996

[54] METHOD FOR MANUFACTURING A CRYSTALIZED GLASS MAGNETIC DISK SUBSTRATE

[75] Inventors: Naoyuki Goto; Katsuhiko Yamaguchi, both of Sagamihara, Japan

[73] Assignee: Kabushiki Kaisya Ohara, Japan

[21] Appl. No.: 442,381

[22] Filed: May 16, 1995

Related U.S. Application Data

[62] Division of Ser. No. 307,889, Sep. 16, 1994.

[30] Foreign Application Priority Data

May 19, 1993 [JP] Japan .................................. 5-139989

[51] Int. Cl.⁶ .................................................. C03B 32/00
[52] U.S. Cl. .................... 65/33.1; 65/33.8; 65/111; 501/5; 501/7; 501/10; 428/694 ST; 428/694 SG
[58] Field of Search ................... 65/33.1, 33.8, 65/111; 501/5, 7, 10; 428/694 ST, 694 SG

[56] References Cited

U.S. PATENT DOCUMENTS

| | | | |
|---|---|---|---|
| 3,231,456 | 1/1966 | McMillan | 65/33.1 |
| 3,977,857 | 8/1976 | Mattox | 65/33 |
| 4,908,727 | 3/1990 | Ezaki et al. | 360/135 |
| 5,093,173 | 3/1992 | Nakagawa et al. | 428/64 |

FOREIGN PATENT DOCUMENTS 61-063542   1/1986   Japan .

*Primary Examiner*—Stevan A. Resan
*Attorney, Agent, or Firm*—Hedman, Gibson & Costigan, P.C.

[57] ABSTRACT

A magnetic disk substrate is made of a glass-ceramic having crystal phases of lithium disilicate ($Li_2O \cdot 2SiO_2$) and alpha-quartz ($SiO_2$). The crystal phase of alpha-quartz is formed of grown crystal grains each having a globular grain structure made of aggregated particles. Each globular grain has a size within a range from 0.3 μm to 3 μm. Surface roughness (Ra) of a polished surface of the magnetic disk substrate is within a range from 15 Å to 50 Å which is an optimum range of surface roughness for the magnetic disk.

2 Claims, 5 Drawing Sheets

FIG.2D
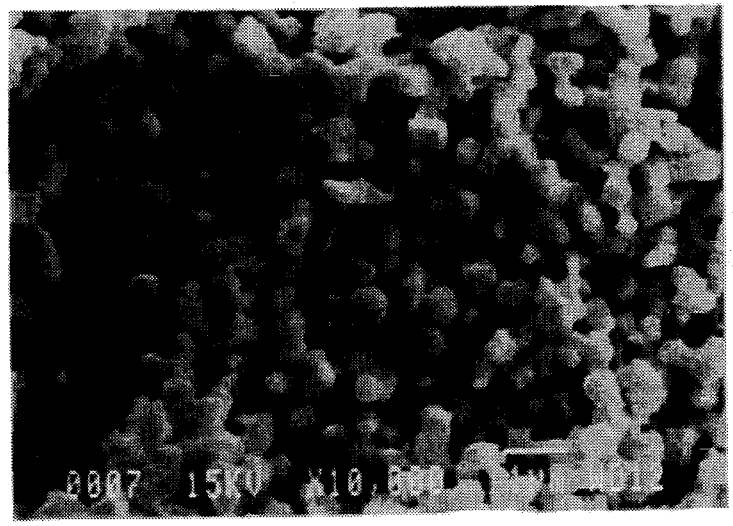
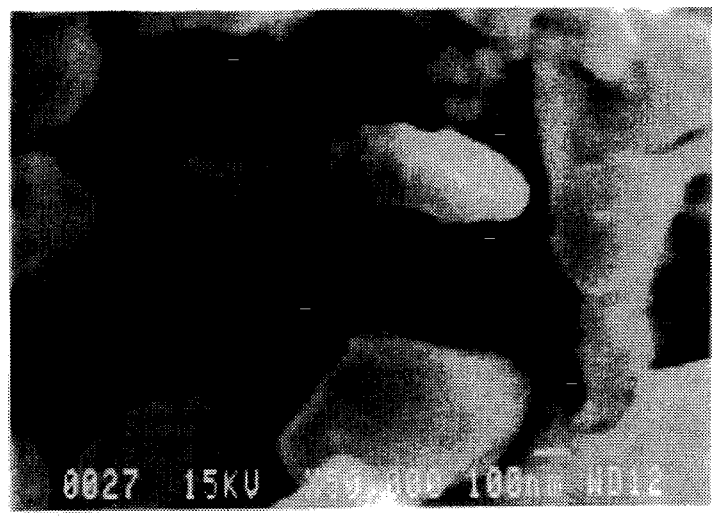
FIG.2E

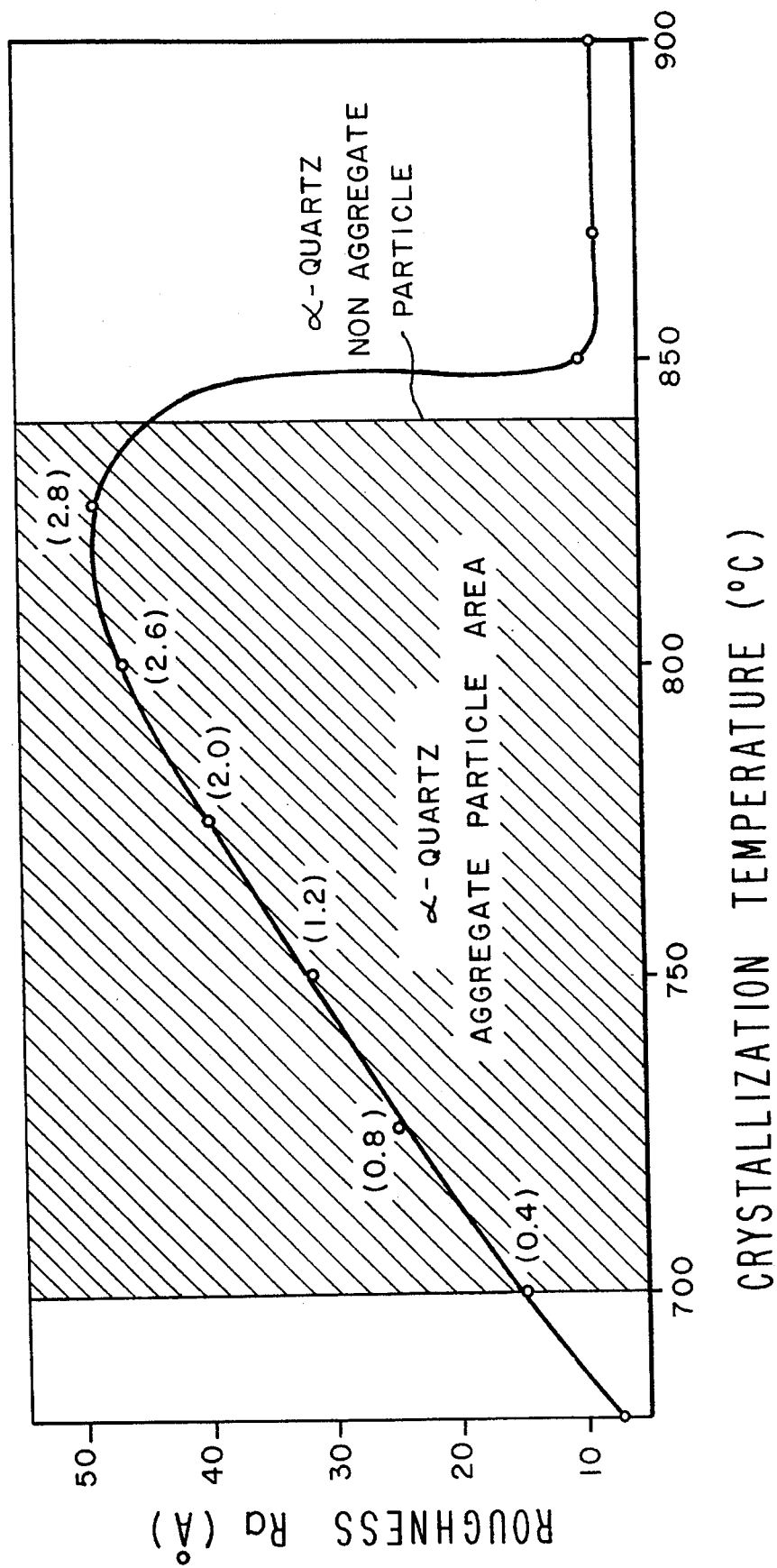

METHOD FOR MANUFACTURING A CRYSTALIZED GLASS MAGNETIC DISK SUBSTRATE

This is a divisional of application Ser. No. 08/307,889, filed Sep. 16, 1994, pending.

BACKGROUND OF THE INVENTION

This invention relates to a magnetic disk substrate made of a glass-ceramic having a crystal structure with improved surface characteristics after polishing, a magnetic disk formed by subjecting the magnetic disk substrate to a film forming process and a method for manufacturing the magnetic disk substrate.

There has been a rapid progress in developments in magnetic disks demand for which has recently increased remarkably as external media of large scale computers and personal computers. Characteristics required generally for a magnetic disk substrate are as follows:

(1) In CSS (contact start and stop) characteristics of a magnetic disk, stiction tends to occur between the head and the magnetic disk due to increase in contact resistance caused by high speed rotation of the magnetic disk, if the magnetic disk has a smooth surface with surface roughness (Ra) below 15 Å. The magnetic disk therefore is required to have surface roughness of 15 Å or more. Moreover, if the magnetic disk has an excessively rough surface having surface roughness exceeding 50 Å, damage to the head or the recording media tends to occur. The surface roughness of the magnetic disk substrate therefore should not exceed 50 Å.

(2) Since the amount of lifting of the head tends to decrease to the order of 0.1 μm to 0.05 μm owing to improvement of recording density of the magnetic disk, the surface of the disk must be flat and relatively smooth.

(3) The material of the magnetic disk substrate must not include anisotropic crystal or other defects and its structure must be dense, homogenious and fine.

(4) The material must have sufficient mechanical strength and hardness for standing a high speed rotation and contact with the head.

(5) The material must not contain $Na_2O$ ingredient in principle because the $Na_2O$ ingredient causes dispersion of sodium ion during the film forming process with resulting deterioration in characteristics of the film.

(6) The material must have chemical durability against rinsing and etching with various chemicals.

Aluminum alloy has been conventionally used as a material of magnetic disk substrate. The alluminum alloy substrate, however, tends to produce a substrate surface having projections or spot-like projections and depressions during the polishing process due to defects inherent in the material. As a result, the alluminum alloy substrate is not sufficient in flatness and surface roughness and cannot cope with the recent requirement for high density recording necessitated by increase in the amount of information.

As material for overcoming this problem of the aluminum alloy substrate, known in the art is a glass substrate for magnetic disks made of chemically tempered glass. This glass substrate, however, has the following disadvantages:

(1) Polishing is made after chemical tempering and so the tempered layer tends to cause instability in thinning the disk substrate.

(2) For improving the CSS characteristics, the substrate must be subjected to mechanical or chemical processing for making texture. This prevents mass production of the product at a competitive cost.

(3) Since the $Na_2O$ ingredient is included as an essential ingredient in the glass, the film forming characteristic of the glass is deteriorated with the result that a surface coating processing becomes necessary. It has recently been put into practice in the field of chemically tempered glass and crystallized glass-ceramic to make the surface of the glass rough during the polishing process for overcoming the problem of the texture processing for improving the CSS characteristics. This technique however is not sufficient either for realizing a stable mass production of the product at a competitive cost.

Aside from the alluminum alloy substrate and chemically tempered glass substrate, known also in the art are glass-ceramics which satisfy some of the above described requirements. For example, the $SiO_2$—$Al_2O_3$—$Li_2O$ system crystallized glass-ceramic described in the Japanese Patent Application Laid-open No. Sho 60-229234 contains beta-quartz solid solution or beta-spodumene solid solution and has a grain diameter of crystal ranging from about 0.1 μm to about 1.0 μm. For another example, the $SiO_2$—$Li_2O$ system glass-ceramic described in the Japanese Patent Application Laid-open No. Sho 62-72547 contains $Li_2O.2SiO_2$ and $Li_2O.SiO_2$ as the main crystalline phase. The $Li_2O.2SiO_2$ phase has a rod-like crystal having a grain diameter of crystal in the range from about 0.3 μm to about 1.5 μm and the $Li_2O.SiO_2$ phase has a granular crystal having a grain diameter of crystal in the range from about 0.3 μm to about 0.5 μm. U.S. Pat. No. 3,231,456 discloses a $SiO_2$—$Li_2O$—$P_2O_5$—$MgO$ system glass-ceramic added with CuO and SnO ingredients in which $Li_2O.2SiO_2$ grown as a main crystal phase and alpha-quartz may be grown as a sub crystal phase. Since, however, these glass-ceramics require a heat treatment for crystallization in a high temperature range from 850° C. to 1050° C., they cannot grow a globular grain structure of aggregated particles as the grain structure of alpha-quartz as the glass-ceramic made according to the present invention as will be discussed in detail later. Besides, in U.S. Pat. No. 3,231,456, the crystal phase and crystal structure are discussed for providing a ceramic material which is suitable for use as a bonding material.

U.S. Pat. No. 3,977,857 discloses a glass-ceramic of a $SiO_2$—$Li_2O$—$MgO$—$P_2O_5$—$(Na_2O+K_2O)$ system which, as a metal bonding glass-ceramic, is suitable for use as an electric insulating material which can be bonded directly to a metal member. The specification of this U.S. patent teaches that the main crystal phase of the glass-ceramic obtained is $Li_2O.2SiO_2$ and does not teach anything about the globular grain structure of aggregated particles as the grain structure of alpha-quartz as in the present invention.

Japanese Patent Application Laid-open No. Sho 63-210039 discloses a glass-ceramic of a $Si_2$—$Li_2O$—$MgO$—$P_2O_5$ system which is suitable for use as a magnetic head substrate. The specification of this publication teaches that the main crystal phases of the glass-ceramic obtained are $Li_2O.2SiO_2$ and alpha-cristobalite and does not teach anything about the globular grain structure of aggregated particles as the grain structure of alpha-quartz as in the present invention. Besides, the nucleating temperature is 550° C.–800° C. and the MgO ingredient is added for the purpose of restricting variation in a coefficient of thermal expansion by coexistence with the $P_2O_5$ ingredient.

In short, crystal phases growing the prior art $Li_2O$—$SiO_2$ system glass-ceramics (i.e., Japanese Patent Application Laid-open No. Sho 62-72547, U.S. Pat. Nos. 3,231,456, 3,977,857 and Japanese Patent Application Laid-open No. 63-210039) are $Li_2O.2SiO_2$ which constitutes the main crystal phase and a small amount of $SiO_2$ (alpha-cristobalite or alpha-quartz) which constitutes the sub crystal phase. Therefore, in these prior art glass-ceramics, the $Li_2O \cdot 2SiO_2$ crystal phase plays a major role and the sub crystal phase of alpha-quartz or alpha-cristobalite does not. These prior art glass-ceramics cannot provide the surface roughness of 15 Å to 50 Å which is necessary for the CSS characteristics of the magnetic disk as the surface roughness inherent in the glass-ceramics after polishing. These prior art glass-ceramics require some kind of texture processing for making the surface of the glass-ceramics rough after the polishing process for improving the CSS characteristics which are essential for the material of a magnetic disk substrate.

It is, therefore, an object of the invention to provide a magnetic disk substrates made of a glass-ceramic which has eliminated the disadvantages of the prior art products and has excellent surface characteristics after polishing by controlling the crystal structure and crystal grain of a crystal produced. It is also an object of the invention to provide a magnetic disk made by subjecting this magnetic disk substrate to a film forming processing. It is also an object of the invention to provide a method for manufacturing such a magnetic disk substrate.

SUMMARY OF THE INVENTION

Accumulated studies and experiments made by the inventors of the present invention for achieving the above described object of the invention have resulted in the finding, which has led to the present invention, that a glass-ceramic obtained by subjecting to heat treatment, within a specific temperature range, a base glass containing, as an essential ingredient, a MgO ingredient in the $SiO_2$—$Li_2O$—$P_2O_5$ system has, as its crystal phases, a microstructure in which globular grains each being made of aggregated particles of alpha-quartz (alpha-$SiO_2$) have randomly grown in a uniformly grown crystal phase of lithium disilicate ($Li_2O \cdot 2SiO_2$), that, since this microstructure consists of the lithium disilicate phase which is mechanically and chemically instable and the alpha-quartz phase of the globular grains each being made of aggregated particles which is mechanically and chemically stable, this microstructure provides a rough surface which is produced by mechanical and chemical actions performed during the polishing process and that a magnetic disk substrate having excellent surface characteristics after polishing is obtainable by controlling the size of the globular grains of aggregated particles of alpha-quartz.

A magnetic disk substrate achieving the above described object of the invention is made of a glass-ceramic having crystal phases of lithium disilicate ($Li_2O \cdot 2SiO_2$) and alpha-quartz ($SiO_2$) characterized in that said crystal phase of alpha-quartz is formed of grown crystal grains each having a globular grain structure made of aggregated particles, each globular grain having a size within a range from 0.3 μm to 3 μm and that surface roughness (Ra) of a polished surface of the magnetic disk substrate is within a range from 15 Å to 50 Å.

In one aspect of the invention, this magnetic disk substrate is formed by subjecting to heat treatment a base glass which consists of in weight percent:

| | |
|---|---|
| $SiO_2$ | 65–83% |
| $Li_2O$ | 8–13% |
| $K_2O$ | 0–7% |
| Mgo + ZnO + PbO | 0.5–5.5% |
| in which MgO | 0.5–5.5% |
| ZnO | 0–5% |
| PbO | 0–5% |
| $P_2O_5$ | 1–4% |
| $Al_2O_5$ | 0–7% |
| $As_2O_3 + Sb_2O_3$ | 0–2% |

In another aspect of the invention, there provided a magnetic disk consisting essentially of the above described substrate having a coating of magnetic media formed on the surface thereof.

In another aspect of the invention, there is provided a method for manufacturing the above described substrate.

DETAILED DESCRIPTION OF THE INVENTION

Figure 1A:
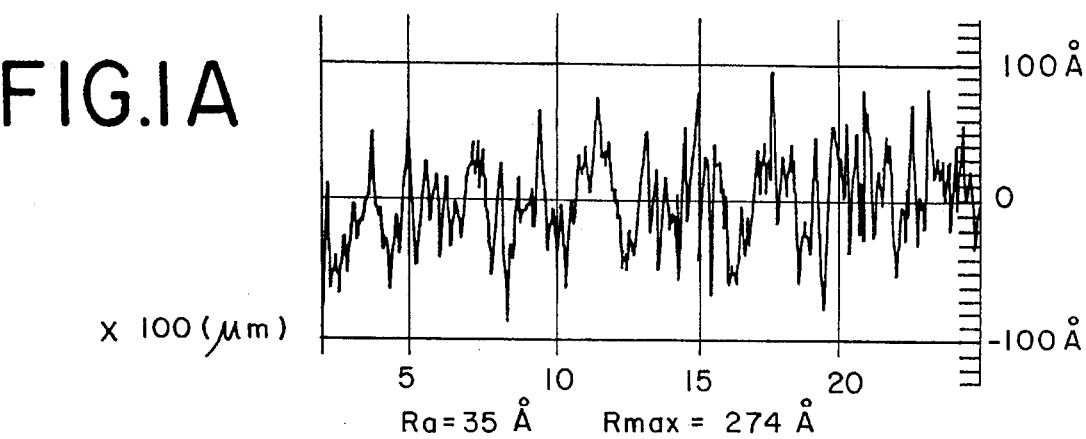

While various compositions may be used as a base glass composition for producing the magnetic disk substrate of the present invention having the above described characteristic feature, one preferred composition range of a glass-ceramic used for producing a magnetic disk substrate of the present invention will be described below. This composition is expressed on the basis of composition of oxides as in its base glass. The above described content ranges of the respective ingredients have been selected for the reasons stated below.

The $SiO_2$ ingredient is an important ingredient which produces alpha-quartz ($SiO_2$) and lithium disilicate ($Li_2O \cdot 2SiO_2$) as crystal phases by heat treating the base glass. If the amount of this ingredient below 65%, the crystal produced in the glass-ceramic is instable and its texture tends to become too rough. If the amount of this ingredient exceeds 83%, difficulty arises in melting the base glass. As a result of experiments, it has been found that a particularly preferable range of this ingredient is from 70% to 82%.

The $Li_2O$ ingredient is also an important ingredient which produces lithium disilicate ($Li_2O \cdot 2SiO_2$) crystal as a crystal phase by heat treating the base glass. If the amount of this ingredient is below 8%, growth of this crystal becomes difficult and melting of the base glass becomes also difficult. If the amount of this ingredient exceeds 13%, the grown crystal of the glass-ceramic becomes instable and its texture tends to become too rough and, besides, chemical durability and hardness of the glass-ceramic are deteriorated. It has been found that a particularly preferable range of this ingredient is from 8% to 12% and the most preferable range is from 8% to 11%.

The $K_2O$ ingredient is an ingredient which improves melting property of the base glass and can be included up to 7%. A particularly preferable range of this ingredient is from 1% to 6%.

The MgO ingredient is an important ingredient which has been found in the present invention to cause a globular crystal grain of aggregated particles of alpha-quartz ($SiO_2$) as the crystal phase to grow randomly in the entire glass. If the amount of this ingredient is below 0.5%, the above described effect cannot be obtained whereas if the amount of this ingredient exceeds 5.5%, growth of a desired crystal becomes difficult. A particularly preferable range is from 1% to 5%.

The ZnO and PbO ingredients may also be added because they have a function similar to that of MgO. If the amount of the ZnO or PbO ingredient exceeds 5%, growth of a desired crystal becomes difficult. A particularly preferable range of ZnO is from 0.2% to 5%.

For the same reason, the total amount of the MgO, ZnO and PbO ingredients should be within the range from 0.5 to 5.5%.

The $P_2O_5$ ingredient is an essential ingredient as nucleating agent for the glass-ceramic. If the amount of this ingredient is below 1%, a desired crystal cannot be produced whereas if the amount of this ingredient exceeds 4%, the grown crystal of the glass-ceramic becomes instable and too rough and, besides, its stability against diversification is deteriorated. A particularly preferable range of this ingredient is from 1% to 3%.

The $Al_2O_3$ ingredient is an effective ingredient for improving chemical durability of the crystallized glass-ceramic. If the amount of this ingredient exceeds 7% the melting property of the base glass is deteriorated and, as a result, the rate of crystal growth of alpha-quartz (alpha-$SiO_2$) as the main crystal phase is reduced. A particularly preferable range of this ingredient is from 1% to 6%.

The $As_2O_3$ and/or $Sb_2O_3$ ingredients may be added as refining agents in melting the base glass. It will suffice if the total amount of one or both of these ingredients up to 2% is added to the glass.

In addition to the above described ingredients, one or more of $B_2O_3$, CaO, SrO, BaO, $TiO_2$ and $ZrO_2$ ingredients may be added in a small amount within the range in which desired properties of the glass-ceramic according to the invention will not be impaired.

For manufacturing the magnetic disk substrate according to the invention, the base glass havfng the above described composition is molten and after being subjected to heat forming and/or cold forming, is heat treated for producing a crystal nucleus under a temperature within a range from 450° C. to 540° C. and is further heat treated for crystallization under a temperature within a range from 700° C. to 840° C.

If the temperature of nucleation is below 450° C., nucleation caused by phase separation due to the $P_2O_5$ ingredient is insufficient whereas if the temperature of nucleation exceeds 540° C., microcrystals of $Li_2O.SiO_2$ which grow as the crystal nucleus fail to grow uniformly and also become gross crystal nucleus and, for this reason, such gross crystal nucleus of lithium monosilicate prevents aggregation of small particles of alpha quartz which subsequently grow and causes them to scatter and grow as monospherical grains of alpha-quartz instead of globular grains each being made of aggregated particles.

The temperature of crystallization, associated with the effect caused by the MgO ingredient, performs a very important function for controlling the size of the globular grain of aggregated particles of alpha-quartz (alpha-$SiO_2$). If the temperature of crystallization is below 700° C., the crystal of alpha-quartz will not grow sufficiently whereas if the temperature of crystallization 840° C., is becomes difficult to maintain the globular grain structure of aggregated particles with resulting failure in obtaining the above described advantage of the invention. The glass-ceramic thus heat treated is then subjected to the lapping process and finally polishing process provide a magnetic disk substrate and the surface roughness (Ra) after final polishing comes within the range from 15 Å to 50 Å.

EXAMPLES

Preferred examples of the glass-ceramic according to the invention will now be described. Table 1 shows examples (No. 1 to No. 13) of the glass-ceramic for a magnetic disk substrate according to the invention and comparative examples of the prior art $SiO_2$—$Li_2O$—$Al_2O_3$—$P_2O_5$ system glass-ceramic (Japanese Patent Application Laid-open No. Sho 62-72547, Comparative Example 1), the $SiO_2$—$Li_2O$—MgO—$P_2O_5$ system glass-ceramic (U.S. Pat. No. 3,231,456, Comparative Example 2) and the $SiO_2$—$Li_2O$—MgO—$P_2O_5$ system glass-ceramic (Japanese Patent Application Laid-open No. Sho 63-210039, Comparative Example 3) together with results of measurements of the temperatures of the heat treatment, the time of the heat treatment, the diameter of grown crystal grain of alpha-qaurtz, main crystal phases and surface roughness (Ra) after polishing. In the Table, α-Q represents alpha-quartz(α-$SiO_2$) and α-Cri represents alpha-cristobalite (α-$SiO_2$).

TABLE 1

(weight %)

| | | Examples | | |
|---|---|---|---|---|
| No. | | 1 | 2 | 3 |
| $SiO_2$ | | 67.5 | 69.0 | 69.5 |
| $Li_2O$ | | 10.0 | 9.0 | 9.0 |
| $Al_2O_3$ | | 6.0 | 5.0 | 5.5 |
| MgO | | 2.5 | 3.5 | 1.0 |
| ZnO | | 1.0 | 0.5 | 0.5 |
| PbO | | 1.5 | 1.5 | 4.0 |
| $K_2O$ | | 6.0 | 7.0 | 6.0 |
| $P_2O_5$ | | 2.0 | 1.5 | 2.0 |
| $As_2O_3$ | | 0.5 | 0.5 | |
| $Sb_2O_3$ | | | | 0.5 |
| Others | | CaO1.0 $B_2O_3$2.0 | BaO1.5 $ZrO_2$1.0 | $TiO_2$2.0 |
| Temperature of nucleation (°C.) | | 480 | 450 | 450 |
| Time of nucleation (Hr) | | 2 | 2 | 2 |
| Temperature of crystallization (°C.) | | 750 | 760 | 770 |
| Time of crystallization (Hr) | | 2 | 3 | 2 |
| Crystal phase | | α-Q $Li_2O.2SiO_2$ | α-Q $Li_2O.2SiO_2$ | α-Q $Li_2O.2SiO_2$ |
| Diameter of α-Q of aggregated particles (μm) | | 0.7 | 0.6 | 0.9 |
| Surface roughness Ra (Å) | | 16 | 15 | 18 |

| | | Examples | | |
|---|---|---|---|---|
| No. | | 4 | 5 | 6 |
| $SiO_2$ | | 73.0 | 76.7 | 75.5 |
| $Li_2O$ | | 8.0 | 10.5 | 10.0 |
| $Al_2O_3$ | | 5.0 | 3.8 | 4.5 |
| MgO | | 4.0 | 2.5 | 1.0 |
| ZnO | | 0.5 | 0.5 | |
| PbO | | | | 2.0 |
| $K_2O$ | | 4.0 | 3.5 | 4.5 |
| $P_2O_5$ | | 4.0 | 2.0 | 2.0 |
| $As_2O_3$ | | 0.5 | 0.5 | 0.5 |
| $Sb_2O_3$ | | | | |
| Others | | SrO1.0 | | |
| Temperature of nucleation (°C.) | | 540 | 480 | 500 |
| Time of nucleation (Hr) | | 5 | 5 | 1 |
| Temperature of crystallization (°C.) | | 780 | 750 | 750 |
| Time of crystallization (Hr) | | 3 | 3 | 2 |
| Crystal phase | | α-Q $Li_2O.2SiO_2$ | α-Q $Li_2O.2SiO_2$ | α-Q $Li_2O.2SiO_2$ |
| Diameter of α-Q of aggregated particles (μm) | | 1.3 | 1.2 | 0.8 |
| Surface roughness Ra (Å) | | 35 | 32 | 18 |

TABLE 1-continued

| | | Examples | | |
|---|---|---|---|---|
| | No. | 7 | 8 | 9 |
| SiO$_2$ | | 76.0 | 76.5 | 78.5 |
| Li$_2$O | | 10.5 | 10.5 | 9.0 |
| Al$_2$O$_3$ | | 4.0 | 3.5 | 2.0 |
| MgO | | 2.5 | 1.0 | 2.5 |
| ZnO | | 0.5 | 2.0 | 1.0 |
| PbO | | | | 1.0 |
| K$_2$O | | 4.0 | 4.0 | 4.0 |
| P$_2$O$_5$ | | 2.0 | 2.0 | 1.5 |
| As$_2$O$_3$ | | 0.5 | 0.5 | 0.5 |
| Sb$_2$O$_3$ | | | | |
| Others | | | | |
| Temperature of nucleation (°C.) | | 500 | 540 | 500 |
| Time of nucleation (Hr) | | 5 | 5 | 5 |
| Temperature of crystallization (°C.) | | 780 | 780 | 780 |
| Time of crystallization (Hr) | | 2 | 5 | 2 |
| Crystal phase | | α-Q Li$_2$O.2SiO$_2$ | α-Q Li$_2$O.2SiO$_2$ | α-Q Li$_2$O.2SiO$_2$ |
| Diameter of α-Q of aggregated particles (μm) | | 1.2 | 1.5 | 1.4 |
| Surface roughness Ra (Å) | | 30 | 40 | 36 |

| | | Example |
|---|---|---|
| | No. | 10 |
| SiO$_2$ | | 82.0 |
| Li$_2$O | | 11.0 |
| Al$_2$O$_3$ | | 1.3 |
| MgO | | 1.0 |
| ZnO | | |
| PbO | | |
| K$_2$O | | 2.5 |
| P$_2$O$_5$ | | 1.7 |
| As$_2$O$_3$ | | 0.5 |
| Sb$_2$O$_3$ | | |
| Others | | |
| Temperature of nucleation (°C.) | | 540 |
| Time of nucleation (Hr) | | 5 |
| Temperature of crystallization (°C.) | | 840 |
| Time of crystallization (Hr) | | 5 |
| Crystal phase | | α-Q Li$_2$O.2SiO$_2$ |
| Diameter of α-Q of aggregated particles (μm) | | 1.3 |
| Surface roughness Ra (Å) | | 33 |

| | | Comparative Examples | | |
|---|---|---|---|---|
| | No. | 1 | 2 | 3 |
| SiO$_2$ | | 71.0 | 80.1 | 79.6 |
| Li$_2$O | | 12.0 | 10.7 | 8.3 |
| Al$_2$O$_3$ | | 9.6 | | 3.0 |
| MgO | | | 3.6 | 1.5 |
| ZnO | | | | |
| PbO | | 0.9 | | |
| K$_2$O | | | | 3.5 |
| P$_2$O$_5$ | | 1.9 | 2.6 | 2.9 |
| As$_2$O$_3$ | | | | 0.3 |
| Sb$_2$O$_3$ | | | | |
| Others | | Na$_2$O 3.8 CaO 0.4 SrO 0.4 | CuO 2.0 SnO 1.0 | Na$_2$O 1.0 |
| Temperature of nucleation (°C.) | | 500 | 550 | 570 |
| Time of nucleation (Hr) | | 5 | 5 | 1 |
| Temperature of crystallization (°C.) | | 840 | 850 | 810 |
| Time of crystallization (Hr) | | 2 | 2 | 2 |
| Crystal phase | | Li$_2$O.2SiO$_2$ α-cri | Li$_2$O.2SiO$_2$ α-Q | Li$_2$O.2SiO$_2$ α-cri |
| Diameter of α-Q of aggregated particles (μm) | | No aggregated particles | No aggregated particles | No aggregated particles |
| Surface roughness Ra (Å) | | 11 | 10 | 10 |

| | | Examples | | |
|---|---|---|---|---|
| | No. | 11 | 12 | 13 |
| SiO$_2$ | | 76.7 | 75.7 | 75.7 |
| Li$_2$O | | 10.5 | 11.0 | 11.0 |
| Al$_2$O$_3$ | | 3.8 | 3.8 | 3.3 |
| MgO | | 2.5 | 3.0 | 3.0 |
| ZnO | | 0.5 | 0.5 | 0.5 |
| PbO | | | | |
| K$_2$O | | 4.0 | 4.3 | 4.0 |
| P$_2$O$_5$ | | 2.0 | 2.0 | 2.0 |
| As$_2$O$_3$ | | 0.5 | 0.5 | 0.5 |
| Sb$_2$O$_3$ | | | | |
| Others | | | | |
| Temperature of nucleation (°C.) | | 540 | 540 | 540 |
| Time of nucleation (Hr) | | 5 | 5 | 5 |
| Temperature of crystallization (°C.) | | 780 | 770 | 740 |
| Time of crystallization (Hr) | | 2 | 2 | 6 |
| Crystal phase | | α-Q Li$_2$O.2SiO$_2$ | α-Q Li$_2$O.2SiO$_2$ | α-Q Li$_2$O.2SiO$_2$ |
| Diameter of α-Q of aggregated particles (μm) | | 1.0 | 1.1 | 1.5 |
| Surface roughness Ra (Å) | | 20 | 22 | 35 |

Figure 1B:
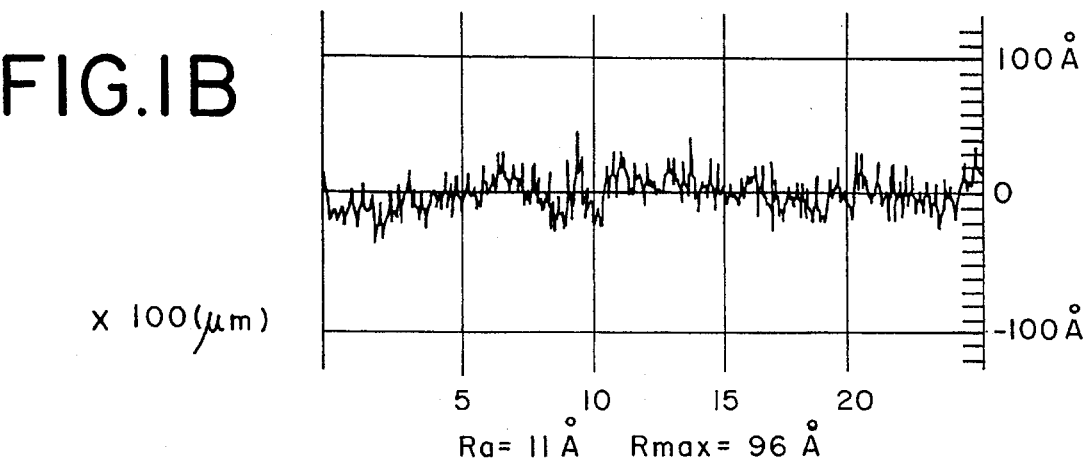
Figure 1C:
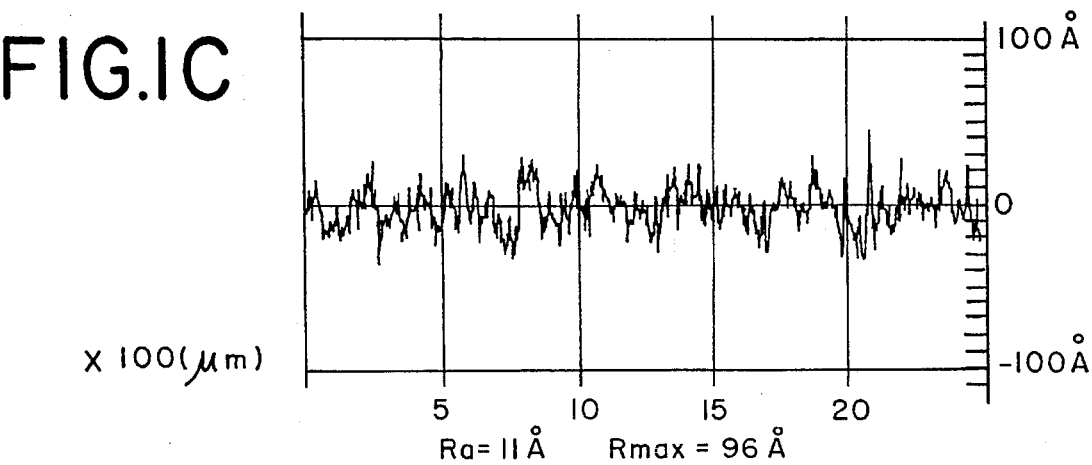
Figure 2A:
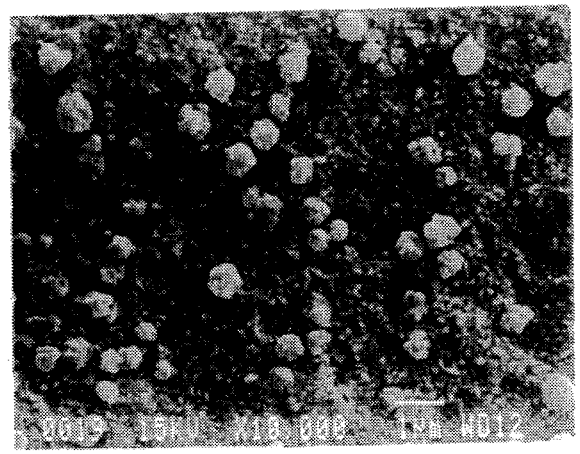
Figure 2B:
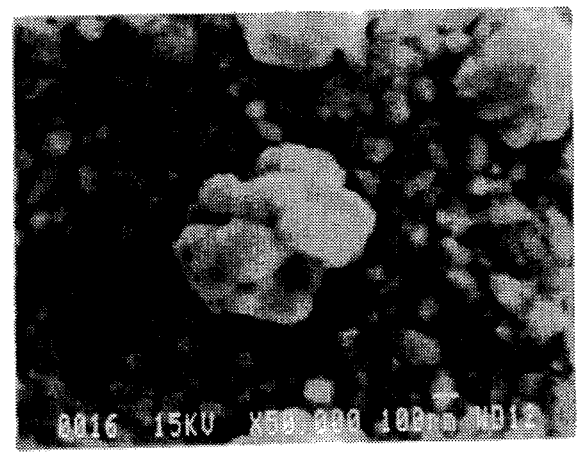
Figure 2C:
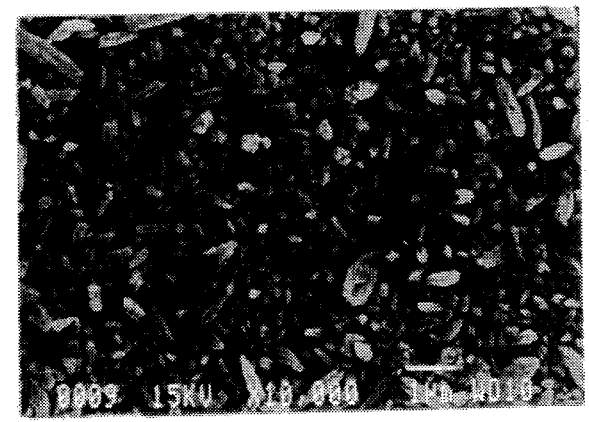
Figure 4:
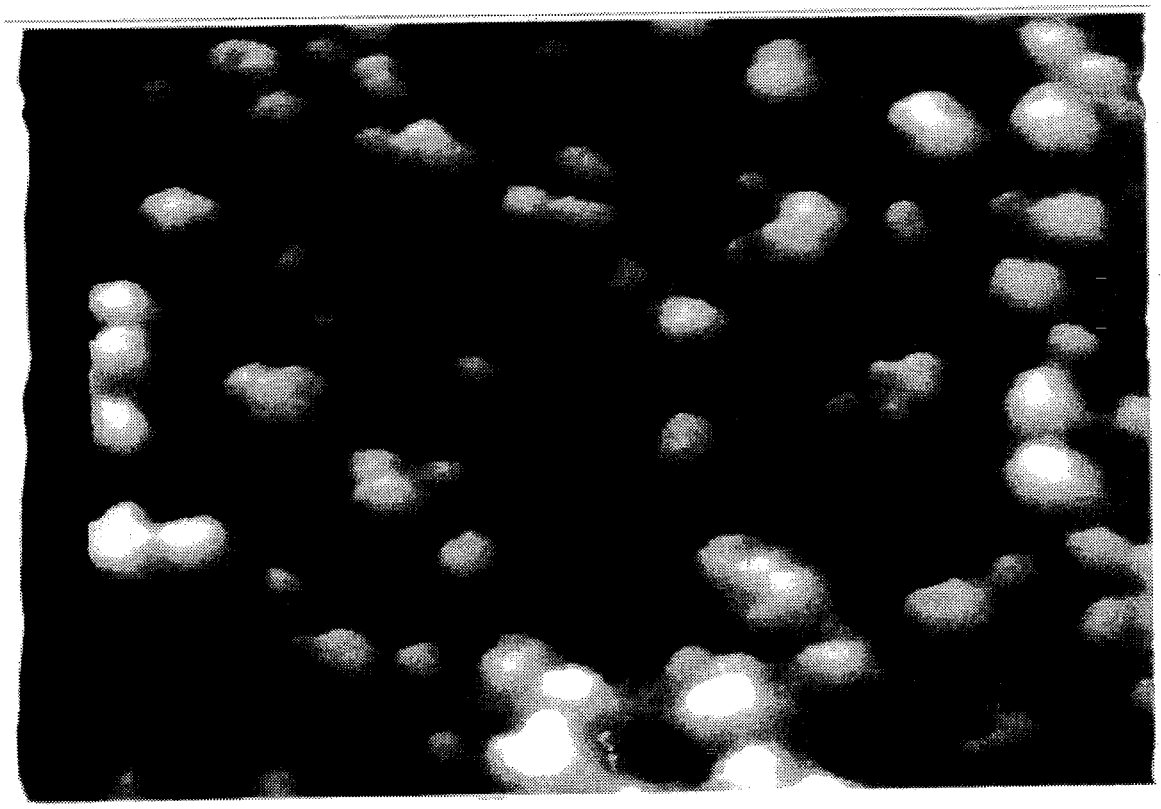

In the accompanying drawings, FIG. 1A shows the surface roughness (Ra) after polishing of the glass-ceramic of Example 4 in Table 1, FIG. 1B that of the glass-ceramic of the Comparative Example No. 1 in Table 1, and FIG. 1C that of the glass-ceramic of the Comparative Example No. 2 in Table 1 for comparison. FIGS. 2A and 2B show SEM (scanning electron microscope) images of the crystal structure after HF etching of the glass-ceramic of Example 4 and FIG. 2C that of the glass-ceramic of the Comparative Example No. 1 and FIGS. 2D and 2E those of the glass-ceramic of the Comparative Example No. 2, respectively for comparison. FIG. 3 is a graph showing relationship between the temperature of crystallization and the surface roughness (Ra) of the aggregated particles of alpha-quartz in the glass-ceramic of Example No. FIG. 4 is a three-dimentional image by AFM (atomic force microscope) of the glass-ceramic of the Example No. 5 having the surface roughness (Ra) of 32 Å after polishing. It will be seen from FIG. 4 that the globular crystal grains each made of aggregated particles of alpha-quartz form minute projections scattered over the entire surface of the magnetic disk substrate.

For manufacturing the glass-ceramics of the above described examples, materials including oxides, carbonates and nitrates are mixed and molten in a conventional melting apparatus at a temperature within the range from about 1350° C. to about 1500° C. The molten glass is stirred to homogenize it and thereafter formed into a desired shape and annealed to provide a formed glass. Then, this formed glass is subjected to heat treatment to produce the crystal nucleus under a temperature within the range from 450° C. to 540° C. for about one to five hours and then is subjected to further heat treatment for crystallization under a temperature range from 700° C. to 840° C. for about one to five hours to produce the desired glass-ceramic. For producing a magnetic disk substrate having the surface roughness (Ra) from 15Å to 50 Å, the above described glass-ceramic is lapped for about 10 to 20 minutes with grains having average grain diameters ranging from 9 μm to 12 μm and then is finally polished for about 30 to 40 minutes with cerium oxide having average grain diameters ranging from 1 μm to 2 μm.

The glass-ceramic substrate is subjected to a film forming process which is known per se and thereby is formed into a high recording density magnetic disk. More specifically, the glass-ceramic substrate is heated in a vacuum state and subsequently is coated, by a sputtering process, with an intermediate layer of cromium, a magnetic layer of cobalt alloy and a protective layer of carbon and then is coated with a lubricating material layer on the surface of the protective layer to provide a magnetic disk.

As shown in Table 1, the glass-ceramic of Example No. 4 has a desired surface roughness but the glass-ceramics of the Comparative Examples Nos. 1 to 3 have no such desired surface roughness. As will be apparent from FIGS. 1A, 1B and 1C, the glass-ceramic of Example No. 4 has a desired surface roughness but the glass-ceramic of the Comparative Examples Nos. 1 and 2 do not. As will be apparent from the SEM images of FIGS. 2A, 2B and 2C, the alpha-quartz crystal grains of the glass-ceramic of Example No. 4 exhibit the globular grain structure of aggregated particles and are projecting from the surface of the glass-ceramic whereas the crystal grains of the Comparative Example No. 1 exhibit the acicular or rod-like grain structure and, accordingly, the desired surface roughness cannot be obtained. Similarly, the crystal grains of the Comparative Example No. 3 exhibit the acicular or rod-like grain structure and the desired surface roughness cannot be obtained. Further, as shown in FIGS. 2D and 2E, the crystal grains of the Comparative Example No. 2 exhibit a non-aggregated mono-spherical structure in which a desired surface roughness cannot be obtained and the grain diamter cannot be controlled freely the applicant's invention as will be described more fully later. As to the grain diameter of the glass-ceramic according to the invention, the grain diameter can be controlled to the range from 0.3 μm to 3 μm by varying heat treatment conditions.

Difference between the globular grain structure made of aggregated particles of alpha-quartz according to the applicant's invention and the non-aggregated mono-spherical grain structure of alpha-quartz of Comparative Example No. 2 will be described more fully below.

As will be apparent from the SEM images of the glass-ceramic of Example No. 4 shown in FIG. 2B, each of alpha-quartz grains of the present invention has a globular structure which is composed of many minute particles aggregated into a globe. These alpha-quartz grains are randomly scattered in the fine particles of lithium disilicate ($Li_2O.2SiO_2$) as shown in FIG. 2A. This state has been found quite beneficial for controlling the surface roughness (Ra) after polishing as will be described below. In contrast, as will be seen from the scanning microscopic photographs of FIGS. 2D and 2E, it has been confirmed by X-ray diffraction analysis that in the glass-ceramic of Comparative Example No. 2, the lithium disilicate ($Li_2O.2SiO_2$) crystal grains and the alpha-quartz (alpha-$SiO_2$) crystal grains grow but distinction in the state of growing between these two different crystal grains is not so clear as in the glass-ceramic of the present invention and, besides, these two crystal grains do not assume definite shapes as in the glass-ceramic of the present invention.

The surface roughness control characteristics of the magnetic disk substrate made according to the invention are obtained by the specific crystal structure of the glass-ceramic in which the globular crystal grains each being formed of aggregated small particles of alpha-quartz which is inherently stronger than lithium disilicate physically and chemically are randomly scattered in the much smaller crystal grains of lithium disilicate. This specific structure causes the lithium disilicate grains to be ground more quickly than the alpha quartz grains in the polishing process and, as a result, the alpha-quartz grains come to project relatively prominently over the surface of the lithium disilicate grains as the polishing process progresses whereby surface roughness (Ra) of a relatively large value can be obtained. It will be clearly seen from the three-dimentional image by AFM shown in FIG. 4 that the globular grains of aggregated small particles of physically and chemically strong alpha-quartz project randomly over the entire polished surface.

An additional advantage of the globular grain structure formed of aggregated particles of alpha-qaurtz in the glass-ceramic which constitutes the magnetic disk substrate of the invention is that the grain diamteter can be variably controlled by changing the temperature of crystallization to such a degree that any desired grain diameter can be achieved. This is because growth of the crystal grain of alpha-quartz in the present invention depends largely upon the degree of aggregation of small particles and this aggregation depends upon the temperature of crystallization employed. Such fine control of the grain diameter can never be achieved in the prior art glass-ceramic of the Comparative Example No. 2 in which the crystal grains are mono-spherical and do not assume definite shapes, though both the lithium disilicate and alpha-quartz crystal phases are produced in the glass-ceramic.

In summing up, in one preferred embodiment of the magnetic disk substrate according to the invention is obtained by heat treating a $SiO_2$—$Li_2O$—$P_2O_5$—$MgO$ system glass of a specific composition range and, therefore, the crystal phase thereof consists of alpha-quartz (alpha-$SiO_2$) and the lithium disilicate ($Li_2O.2SIO2$). The grown crystal grain of alpha-quartz has a globular grain structure formed of aggregated particles which facilitates control of the grain size by heat treatment and achievement of a desired surface roughness of the polished surface whereby the glass-ceramic can be utilized as an excellent magnetic disk substrate.

According to the method for manufacturing the magnetic disk substrate according to the invention comprising the steps of melting and forming the above described base glass and then subjecting the formed glass to heat treatment for producing a crystal nucleus under a temperature within the range from 450° C. and 540° C. and then to a further heat treatment for crystallization under a temperature within a range from 700° C. to 840° C., the globular grains formed of aggregated particles and thereby has excellent characteristics can be manufactured at good yield.

What is claimed is:

1. A method for manufacturing a magnetic disk substrate comprising the steps of:

melting a base glass consisting essentially in weight percent of:

| | |
|---|---|
| Li$_2$O | 8–13% |
| K$_2$O | 0–7% |
| MgO + ZnO + PbO | 0.5–5.5% |
| in which MgO | 0.5–5.5% |
| ZnO | 0–5.5% |
| PbO | 0–5.5% |
| P$_2$O$_5$ | 1–4% |
| Al$_2$O$_3$ | 0–7% |
| As$_2$O$_3$ + Sb$_2$O$_3$ | 0–2% | forming the molten glass into a desired shape;
heating the formed glass to produce a crystal nucleus under a temperature within a range from 450° C. to 540° C.;
heating the glass at a temperature within a range from 700° C. to 840° C. to further crystallize the glass; and
polishing the surface of the glass to a surface roughness within a range of 15 Å to 50 Å to produce a magnetic disk substrate having crystal phases which consist of lithium disilicate Li$_2$O.2Si$_2$O) and alpha quartz (SiO$_2$), said crystal phase of alpha-quartz being formed of grown crystal grains each having a globular grain structure made of aggregated particles and said crystal grains of alpha-quartz being randomly scattered in the finer particles of lithium disilicate, and said magnetic disk substrate having a polished surface having a surface roughness within a range of 15 Å to 50 Å.

2. A method for manufacturing a magnetic disk substrate comprising the steps of:

melting a base glass consisting essentially in weight percent of:

| | |
|---|---|
| SiO$_2$ | 70–82% |
| Li$_2$O | 8–12% |
| K$_2$O | 1–6% |
| MgO + ZnO + PbO | 1.5–5.0% |
| in which MgO | 1–5% |
| ZnO | 0.2–5% |
| P$_2$O$_5$ | 1–3% |
| Al$_2$O$_3$ | 1–6% |
| As$_2$O$_3$ + Sb$_2$O$_3$ | 0–2% | forming the molten glass into a desired shape;
heating the formed glass to produce a crystal nucleus under a temperature within a range from 450° C. to 540° C.;
heating the glass at a temperature within a range from 700° C. to 840° C. to further crystallize the glass; and
polishing the surface of the glass to to produce a magnetic disk substrate having crystal phases which consist of lithium disilicate Li$_2$O.2Si$_2$O) and alpha quartz (SiO$_2$), said crystal phase of alpha-quartz being formed of grown crystal grains each having a globular grain structure made of aggregated particles and said crystal grains of alpha-quartz being randomly scattered in the finer particles of lithium disilicate, and said magnetic disk substrate having a polished surface having a surface roughness within a range of 15 Å to 50 Å.

* * * * *

UNITED STATES PATENT AND TRADEMARK OFFICE
CERTIFICATE OF CORRECTION

PATENT NO.  : 5,567,217
DATED       : October 22, 1996
INVENTOR(S) : Goto et al.

It is certified that error appears in the above-identified patent and that said Letters Patent is hereby corrected as shown below:

On Claim 1, line 1, col. 11, add the term "$SiO_2$ 65-83%".

Signed and Sealed this

Twenty-second Day of April, 1997

Attest:

BRUCE LEHMAN

*Commissioner of Patents and Trademarks*

*Attesting Officer*

UNITED STATES PATENT AND TRADEMARK OFFICE
CERTIFICATE OF CORRECTION

PATENT NO. : 5,567,217  Page 1 of 1
DATED : October 22, 1996
INVENTOR(S) : Naoyuki Goto et al.

It is certified that error appears in the above-identified patent and that said Letters Patent is hereby corrected as shown below:

Column 12,
Line 20, delete "$Li_2O.2Si_2O$" and insert -- $Li_2O.2SiO_2$ --.

Signed and Sealed this

Second Day of May, 2006

JON W. DUDAS
*Director of the United States Patent and Trademark Office*